Sept. 13, 1932.  L. SHADLE  1,877,066
DUMPING PLATFORM
Filed Jan. 5, 1931  2 Sheets-Sheet 1
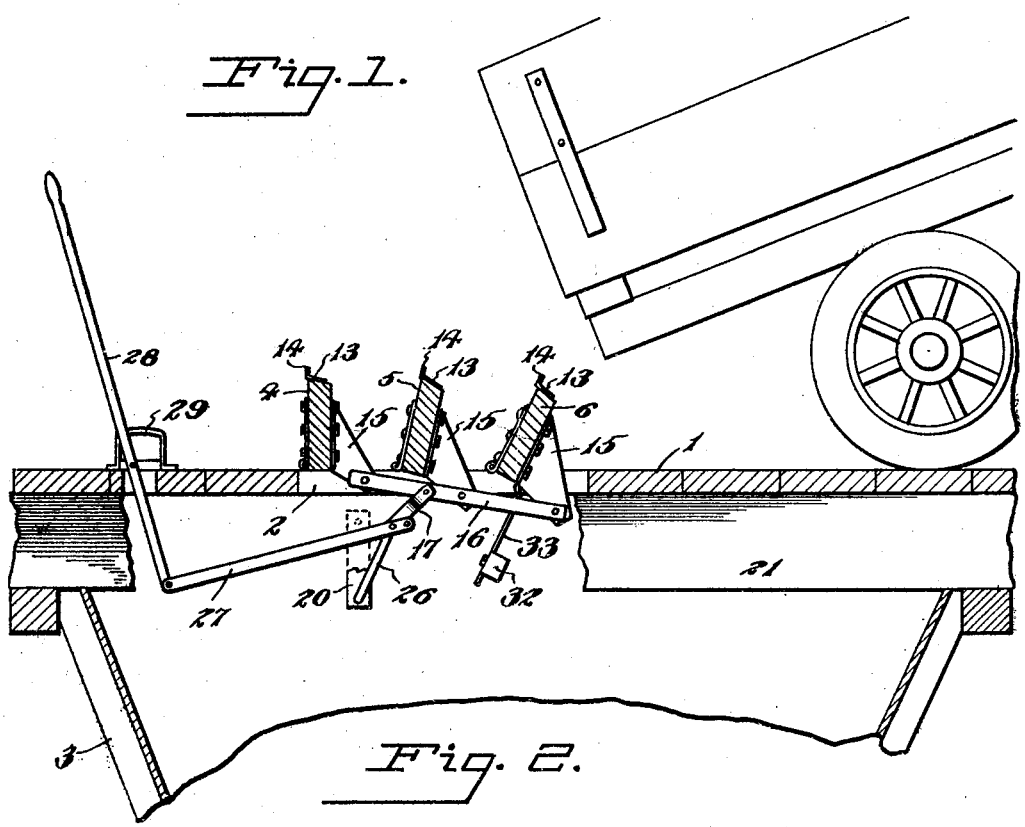
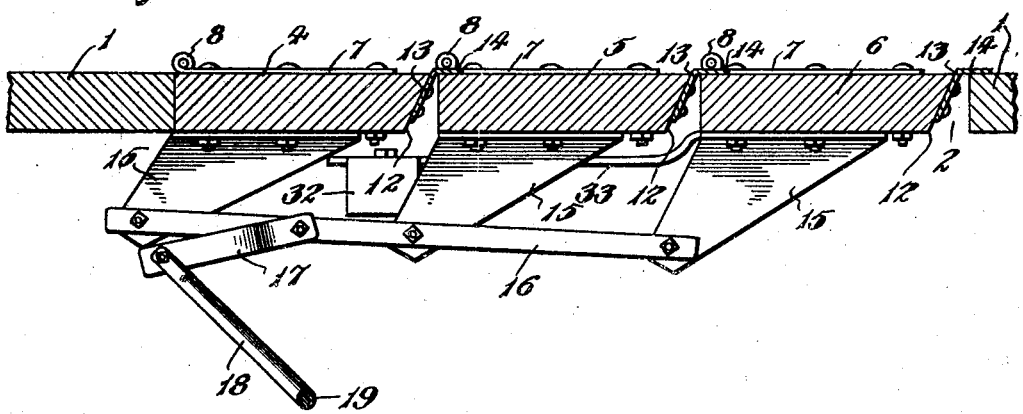
Inventor
Lafe Shadle
By Lacey & Lacey, Attorneys Sept. 13, 1932.  L. SHADLE  1,877,066
DUMPING PLATFORM
Filed Jan. 5, 1931   2 Sheets-Sheet 2
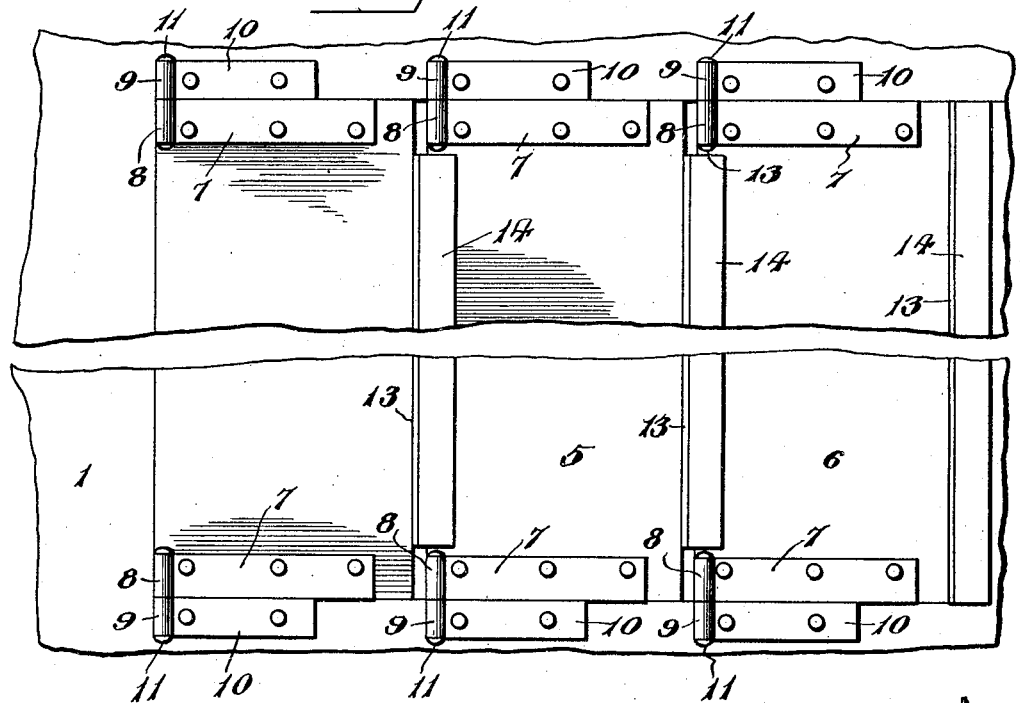
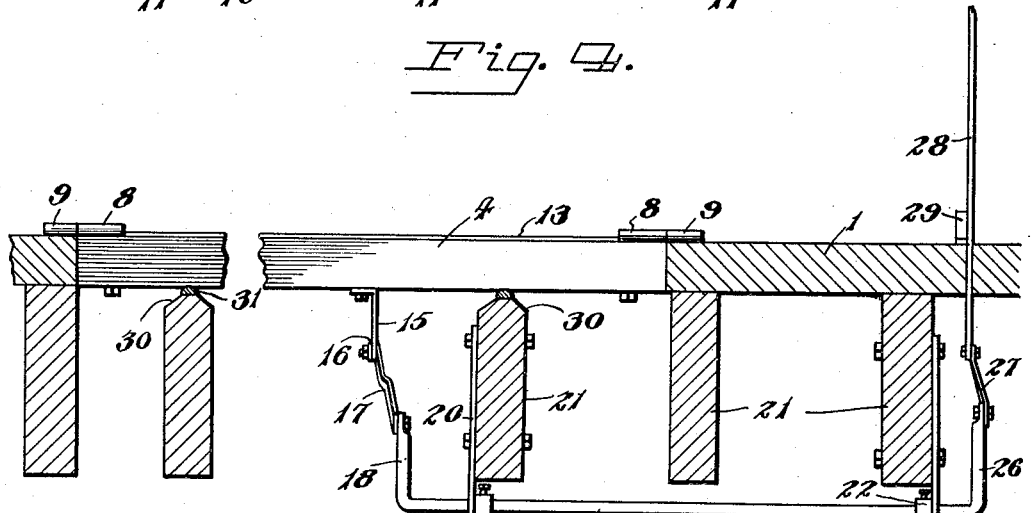
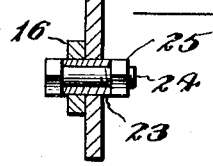

Patented Sept. 13, 1932

1,877,066

UNITED STATES PATENT OFFICE

LAFE SHADLE, OF BOXHOLM, IOWA

DUMPING PLATFORM

Application filed January 5, 1931. Serial No. 506,726.

This invention relates to the closures for the chutes or hoppers employed in grain elevators. In grain elevators, the floors are provided with dumping platforms or sections adjacent the upper ends of chutes into which the grain is delivered directly from the wagons in which it is brought to the elevator, the wagons being driven over the floor to the dumping position so that the rear end of the wagon is immediately adjacent the upper end of the chute and a hoisting mechanism is employed so that the wagon will be tilted and the grain in the wagon will be discharged into the hopper. It is customary at present to provide the chutes or hoppers with doors consisting of single members of sufficient size to fit within the entire mouth or top of the chute and close the same so that a wagon may be driven over the chute to the dumping point. When the grain elevator is in active operation, this door must be opened and closed many times during the day and the opening and closing entails considerable hard labor. It is the object of the present invention to provide a structure which will actually close the mouth or top of the chute when grain is not being dumped and will permit the grain wagons to be driven thereover, and which may be manipulated with minimum labor to open the chute and provide access for the grain thereto. An embodiment of the invention is illustrated in the accompanying drawings and will be hereinafter fully described, the novel features being subsequently particularly pointed out in the appended claim.

In the drawings:

Figure 1 is a sectional elevation of a device embodying the invention, showing a grain wagon in dumping position and the closure opened, Fig. 2 is an enlarged sectional view showing the closure shut so as to cover the hopper, Fig. 3 is a top plan view of the closure in closed position, Fig. 4 is a transverse section of the closure, and Fig. 5 is an enlarged detail view of a construction which is preferably employed in the several pivotal joints of the apparatus.

In the drawings, the reference numeral 1 indicates the floor of a grain elevator and 2 indicates the opening in the floor over the hopper or chute 3, which has its upper end, in the illustrated arrangement, abutting the bottom of the floor around said opening, as shown in Fig. 1. The closure constituting my invention comprises three or more sections, 4, 5 and 6, which are of like construction and each of which consists of a timber or board of the same thickness as the floor and of sufficient length to extend entirely across the opening 2 or mouth of the hopper. Each section is provided at two corners with hinge straps 7, the eyes 8 of which are each arranged in axial alinement with the eye 9 of a hinge strap 10 which is secured upon the floor at the side of the chute and flush with the side wall of the opening 2, pintles 11 being fitted through the alined eyes so that the closure sections will be hingedly secured to the floor. Upon reference to Fig. 3, it will be noted that the fastenings for the hinge leaves 7 are located near the inner edges of the same. When installing the present invention in old buildings, it may be necessary to bevel the side edges of the door sections to conform to the existing structure at the opening, and the shown arrangement of the fastenings enables me to put them through the extreme thickness of the door section, even though the edge be beveled. The free or swinging edge of each section is beveled, as shown at 12 in Fig. 2, and to said beveled edge is secured a shield or wear iron 13 which projects above the top surface of the section a distance equal to the thickness of the iron and is then carried forwardly in a flange or lip 14, which is adapted to rest upon the immediately adjacent section so as to cover the joint between adjacent sections and provide an uninterrupted surface over which the wagon may be driven. If preferred, a slight recess or channel may be formed in the upper surface of the forward sections so that the lips or flanges will be flush with the top surfaces of the several sections, but this structure is not essential. It is to be noted that the wear iron secured upon the section 6 has its lip or flange projecting over the adjacent portion of the floor 1 so that the joint between the closure and the floor will be covered. These flanges or lips also aid in supporting the several sections, as will be clear upon reference to Fig. 2.

To the under side of each section is secured a bracket 15, preferably located near one side edge of the same. Each bracket comprises a depending arm, as clearly shown in the drawings, and said depending arms are operatively connected by a link or connecting bar 16 which is pivoted to the lower ends of the several arms, the brackets being successively of increasing length from the hinge side of the closure to the opposite side of the same, the result being that when the several closure sections are raised or opened, as shown in Fig. 1, they will assume different relations to the perpendicular, the section most remote from the wagon being approximately vertical, while the other sections are disposed at greater inclinations as they approach the wagon. This arrangement will offer the least obstruction to the grain flowing from the wagon and will most effectually direct it into the chute, and it will be understood that the force in the grain is taken primarily by the wear irons 13 so that the wear upon the wooden sections is minimized. Pivoted to the connecting bar 16 is a link 17 which extends to and is pivoted to the upper end of a crank 18 on the inner end of a rock shaft 19 which is journaled in hangers 20 secured to and depending from some of the floor joists 21, stop collars 22 being secured upon the shaft to bear against the hangers and thereby resist endwise movement of the shaft. Wherever two parts are pivotally jointed, a bushing 23 is fitted through the openings in the cooperating parts, as shown in Fig. 5, and a pivot bolt 24 is fitted through the bushing, a nut 25 upon the bolt bearing against one end of the bushing while the head of the bolt bears against the opposite end thereof. This arrangement will effectually prevent separation of the parts but will obviate any binding pressure thereon so that they will work freely and easily at all times. On the outer end of the rock shaft 19 is a crank 26 and connected thereto is a connecting rod 27 which extends to and is pivoted to the lower end of a hand lever 28 which extends up through the floor and is fulcrumed upon the same in position to cooperate with a holding rack 29 of any approved form whereby it may be maintained in a set position. The hand lever is shown as located near and at one side of the hopper opening but it may be located where preferred, the only essential being that it be out of the way of vehicles moving to and from the dump.

It will be understood, of course, that some of the joists or sills 21 extend across the hopper 2. To prevent grain collecting on the sills, I bevel the upper edges thereof, as shown at 30 in Fig. 4, and upon said edges I secure the narrow metal strips or shoes 31 having convex upper surfaces whereby all matter which may tend to lodge thereon will be deflected to the side and drop between the joists into the hopper.

For large doors, I provide a counterweight 32 which may be secured on the under side of one of the sections at any convenient point between the joists. The weight is carried by a bar 33 which is secured to the door section and projects beyond the hinged edge thereof, the weight being secured on the projecting end portion of the bar and adjustable along the same. By counterbalancing the door, the labor of opening it is overcome so that it responds readily to the movement of the hand lever and will swing easily at all times.

From the foregoing description taken in connection with the accompanying drawings, it is thought the operation of the device will be readily understood. Normally, the doors are closed, as shown in Fig. 2. While in this position, a loaded wagon may be driven over the door sections and brought to rest on the floor adjacent the opening, as indicated in Fig. 2. The door sections are then swung upwardly through manipulation of the lever 30, the movement of which is transmitted through the described connections to the link 16 so that the door sections will be swung upwardly to the position shown in Fig. 1, whereupon the wagon is tilted and the grain discharged therefrom into the chute.

It will be readily noted that I have provided a very compact structure which may be very easily raised and lowered and which, when raised, will not extend upwardly to such a height as to obscure the view of any of the parts, and accidents, due to such obstructing of the view, will be eliminated. The apparatus may be installed in elevators in course of construction and may be also installed in elevators now erected, without involving any heavy expense or excessive structural changes in the building.

Having thus described the invention, I claim:

In an apparatus for the purpose set forth, a closure consisting of a series of similar sections each hingedly mounted at one side edge, brackets secured to the under sides of the sections and each having a depending arm, said arms being of successively increasing length from one side of the series of sections toward the opposite side thereof, a connecting bar pivoted to the lower end of each of said arms, and means connected to said bar for swinging the several sections to raised or lowered position.

In testimony whereof I affix my signature.

LAFE SHADLE. [L. s.]